United States Patent
Kikel

(10) Patent No.: US 9,586,729 B1
(45) Date of Patent: Mar. 7, 2017

(54) REUSABLE SEALING BOTTLE CAP ASSEMBLY

(71) Applicant: Christopher Raymond Kikel, Pittsburgh, PA (US)

(72) Inventor: Christopher Raymond Kikel, Pittsburgh, PA (US)

( * ) Notice: Subject to any disclaimer, the term of this patent is extended or adjusted under 35 U.S.C. 154(b) by 0 days.

(21) Appl. No.: 14/986,656

(22) Filed: Jan. 2, 2016

Related U.S. Application Data

(63) Continuation of application No. 14/803,871, filed on Jul. 20, 2015.

(60) Provisional application No. 61/999,359, filed on Jul. 24, 2014.

(51) Int. Cl.
  *G06K 19/06* (2006.01)
  *B65D 41/02* (2006.01)
  *B65D 53/02* (2006.01)
  *G06K 19/07* (2006.01)

(52) U.S. Cl.
  CPC ............ *B65D 41/02* (2013.01); *B65D 53/02* (2013.01); *G06K 19/0723* (2013.01)

(58) Field of Classification Search
  USPC ........................................ 235/375, 451, 492
  See application file for complete search history.

(56) References Cited

U.S. PATENT DOCUMENTS

| | | | |
|---|---|---|---|
| 3,080,991 A | | 3/1963 | Fox |
| 3,893,582 A | * | 7/1975 | Kowalik ............... B65D 50/046<br>215/221 |
| 4,278,180 A | * | 7/1981 | Willis ................ B65D 41/3409<br>215/252 |
| RE33,764 E | * | 12/1991 | Cochrane ............ B29C 45/4407<br>215/232 |
| 5,163,571 A | | 11/1992 | Morini |
| 5,226,901 A | * | 7/1993 | Dhaliwal ............... A61K 33/00<br>604/415 |
| 5,421,469 A | * | 6/1995 | Lee .................... B65D 55/0872<br>215/247 |
| 2005/0205513 A1 | * | 9/2005 | Hidding ................. B65D 1/023<br>215/246 |
| 2008/0251531 A1 | * | 10/2008 | Coe .................... B65D 83/0454<br>221/265 |
| 2009/0028999 A1 | | 1/2009 | Melisch et al. |
| 2010/0181381 A1 | * | 7/2010 | Carrender .......... G06K 19/0723<br>235/488 |

\* cited by examiner

*Primary Examiner* — Tuyen K Vo
(74) *Attorney, Agent, or Firm* — Suzanne Kikel

(57) ABSTRACT

A reusable sealing bottle cap assembly comprises a cap for placement onto the mouth of a bottle and an annular ring. The cap comprises an enclosed upper portion for enclosing the open mouth of the bottle, a circumferential area or recess adjacent to the enclosed upper portion of the cap, an extended ledge, and a circumferential lip on the underside of the cap for placement of the cap into the inner edge of the mouth of the bottle. The annular ring is receivable around the circumferential area of the cap for securing and sealing the cap onto the open mouth of the bottle. The annular ring comprises an outer flexible material and an inner rigid material. The cap and annular ring may be separate pieces or connected by a strap. The bottle cap assembly may be made of plastic resins; metals; silicones; bio-degradable materials; and/or oxygen absorbing materials.

15 Claims, 3 Drawing Sheets

REUSABLE SEALING BOTTLE CAP ASSEMBLY

CROSS REFERENCE TO RELATED APPLICATIONS

This application claims priority to U.S. Ser. No. 14/803,871 filed Jul. 20, 2015, which, in turn, claims priority to U.S. Provisional Patent Application Ser. No. 61/999,359 filed Jul. 24, 2014, the disclosures of which are incorporated hereby by reference in their entirety.

BACKGROUND OF THE INVENTION

1. Field of the Invention

The present invention relates generally to the field of bottle caps and closures, and more particularly to a reusable sealing cap assembly for bottles containing liquids under pressure, such as carbonated beverages and also on bottles containing non-carbonated liquids. The reusable sealing bottle cap assembly of the invention may find particular application in the field of home beer making processing, and may expand into mass use and distribution through commercial markets.

2. Brief Description of the Prior Art

Bottle capping devices are known in the art. Some of these devices comprise various wire form stoppers for installation on the mouth of a bottle or jar. An example of a wire form stopper is disclosed in Coker, U.S. Pat. No. 4,746,027. This reusable sealing cap for bottles has a flat radially extending circular flange on the neck of the bottle which is spaced below the top edge of the mouth of the bottle. The reusable cap is removeably received on the open mouth and partially surrounds the upper neck portion of the bottle. The cap member carries a resilient seal which fits over the open mouth of the bottle to sealably enclose the open mouth of the bottle. A movable spring wire lever is pivotally mounted on the cap and bent in a configuration to form a flange engaging portion to be slidably received and biased beneath the circular flange in the sealing position. A pair of laterally opposed arcuate portions creates spring tension to create a compressive force between the cap and the circular flange sufficient to compress the resilient seal and effect a liquid tight seal on the open mouth of the bottle when the flange engaging portion is biased beneath the circular flange. The lever configuration includes a pair of smaller arcuate portions cooperative with the lateral arcuate portion to provide additional compressive force in the sealing position. The lateral arcuate portions also serve as a finger receiving handle for carrying the bottle. Other examples of wire form stoppers are disclosed in U.S. Pat. Nos. 211,440 and 610,721.

Some disadvantages of the wire form stoppers are that they are complicated in construction, mechanical in nature, and require a specific style of bottle for their use.

Additional prior art bottle sealing caps, particularly those which are currently provided on beer bottles, include metal caps which undergo a crimping process alongside the cap which is placed on top of the bottle in order to secure the cap to the open mouth of the bottle to sealably enclose the open mouth of the bottle. Disadvantages of this type of bottle cap include a one-time use of the crimped bottle cap wherein the cap cannot be used for resealing the open mouth of the bottle or used on another bottle; the need for a bottle opener; and discarding of the bottle cap with little regard to the cap or the bottle. Additionally, a special crimping device is required for securing the cap to the bottle.

Further prior art bottle caps include the twist-top type. Both sides of the cap and the upper neck portion of the bottle have corresponding threads. A disadvantage is that machining of the upper neck portion of the bottle and the cap is mandatory during the bottle and cap making process in order for the twist top bottle cap to be secured to the bottle. A further disadvantage of the twist top bottle cap is that, in general, the bottle cap and the bottle are both discarded and not reused.

Further examples of bottle sealing cap assemblies are disclosed in U.S. Pat. Nos. 468,258; 3,450,291; 3,080,991; and 5,163,571.

In the home beer brewing process, it is known to use a wire form stopper containing opposed bent wire retainer levers which extend into an aperture in the upper neck portion of the bottle. A cap member is attached to the opposed bent wire retainer levers and is pivoted upwardly to bring the cap member into engagement with the open mouth of the beer bottle for sealing thereof. These wire form stoppers may be similar to those discussed herein above, and as stated, a disadvantage of this type of sealing cap assembly is that the bottles need to be specially produced in order to receive the wire form stopper. Additionally, these specialty bottles with their cooperating wire form stopper caps tend to be relatively expensive. And still a further disadvantage is that if the home beer brewer utilizes this type of bottle and cap assembly in the beer brewing process and then gives the beer to another person, a great expense may be incurred in that in most instances this beer bottle and wire form stopper acting as a cap assembly is not returned to the home beer brewer. A further disadvantage with mechanical bottle capping devices, such as crimping devices, is that over time and use, multiple failure points may develop in the sealing caps and/or devices, thereby rendering the caps and/or devices inoperable.

There is, therefore, a need in the art to provide a reusable sealing cap for a bottle which is simple in construction; which may be less expensive compared to current day bottle caps; which involves more than a one-time use; which does not require a bottle opener; which is easy to sanitize; and which simplifies the bottling process by eliminating the crimping device necessary in some current day sealing caps.

There is a further need in the art to provide a reusable sealing cap for a bottle which can be used on any size or configuration of the open mouth of the bottle.

There is still a further need in the art especially in the home beer brewing processing to provide a reusable sealing bottle cap assembly which fits tightly onto and seals a conventional standard glass or plastic bottle having a circular bead or lip for receiving the cap assembly.

SUMMARY OF THE INVENTION

The present invention provides such a device. The invention provides a reusable sealing bottle cap assembly which comprises a cap and annular ring for placement onto the open mouth of a bottle. The cap comprises an enclosed upper portion for enclosing the open mouth of the bottle; a circumferential area adjacent to the enclosed upper portion of the cap; an extended ledge section located adjacent to the circumferential area; and in some embodiments, a circumferential lip located on the underside of the cap for placement of the cap into the inner edge of the open mouth of the bottle. The annular ring is receivable around the circumferential area of the cap for locking, securing and sealing the cap onto the mouth of the bottle. The cap and annular ring may be two separate pieces, or they may be interconnected by a strap or band to form a one-piece reusable sealing bottle cap construction. The bottle cap assembly material includes but is not limited to plastic resins; metals; silicones; biodegradable materials; oxygen absorbing materials; and/or combinations thereof. In some embodiments of the invention, the circumferential area may comprise an annular recess or groove for receiving the annular ring. In some embodiments of the invention, the annular ring may be comprised of a rigid material, for example, a plastic resin, such as, for example, polypropylene, and the cap and strap or band which connects the cap to the annular ring may be comprised of a flexible material, such as, for example, a thermoplastic elastomer. In some embodiments of the invention, the annular ring may be comprised of an inner rigid material, for example, polypropylene, and an outer flexible material, such as, for example, a thermoplastic elastomer.

These and other features and advantages of the present invention will be better appreciated and understood when the following description is read in light of the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
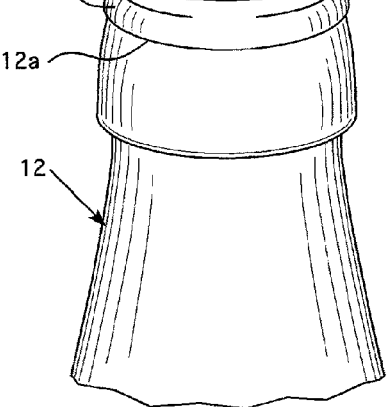
FIG. 1 is an exploded, perspective view of a reusable sealing bottle cap assembly of a first embodiment of the invention with a bottle partially shown.
Figure 2:
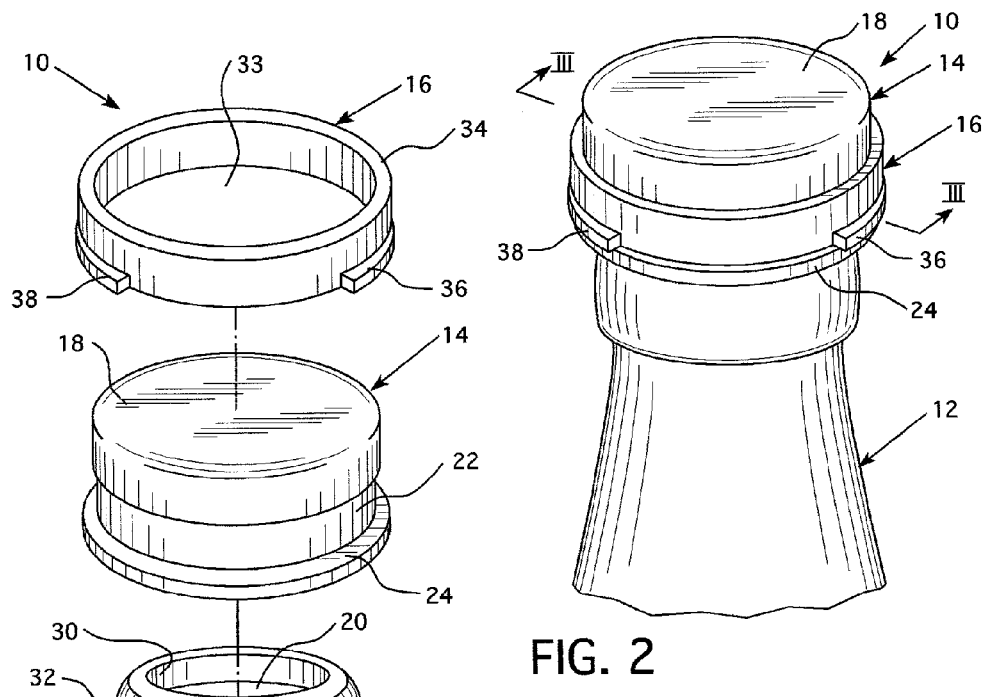
FIG. 2 is a perspective view of the reusable sealing bottle cap assembly of FIG. 1 secured to the open mouth of a bottle.
Figure 3:
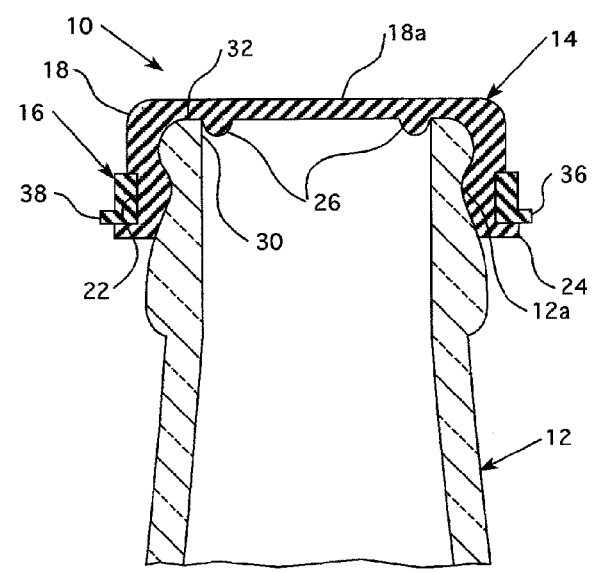
FIG. 3 is a cross-sectional view taken along lines III-III of FIG. 2.
Figures 4, 5:
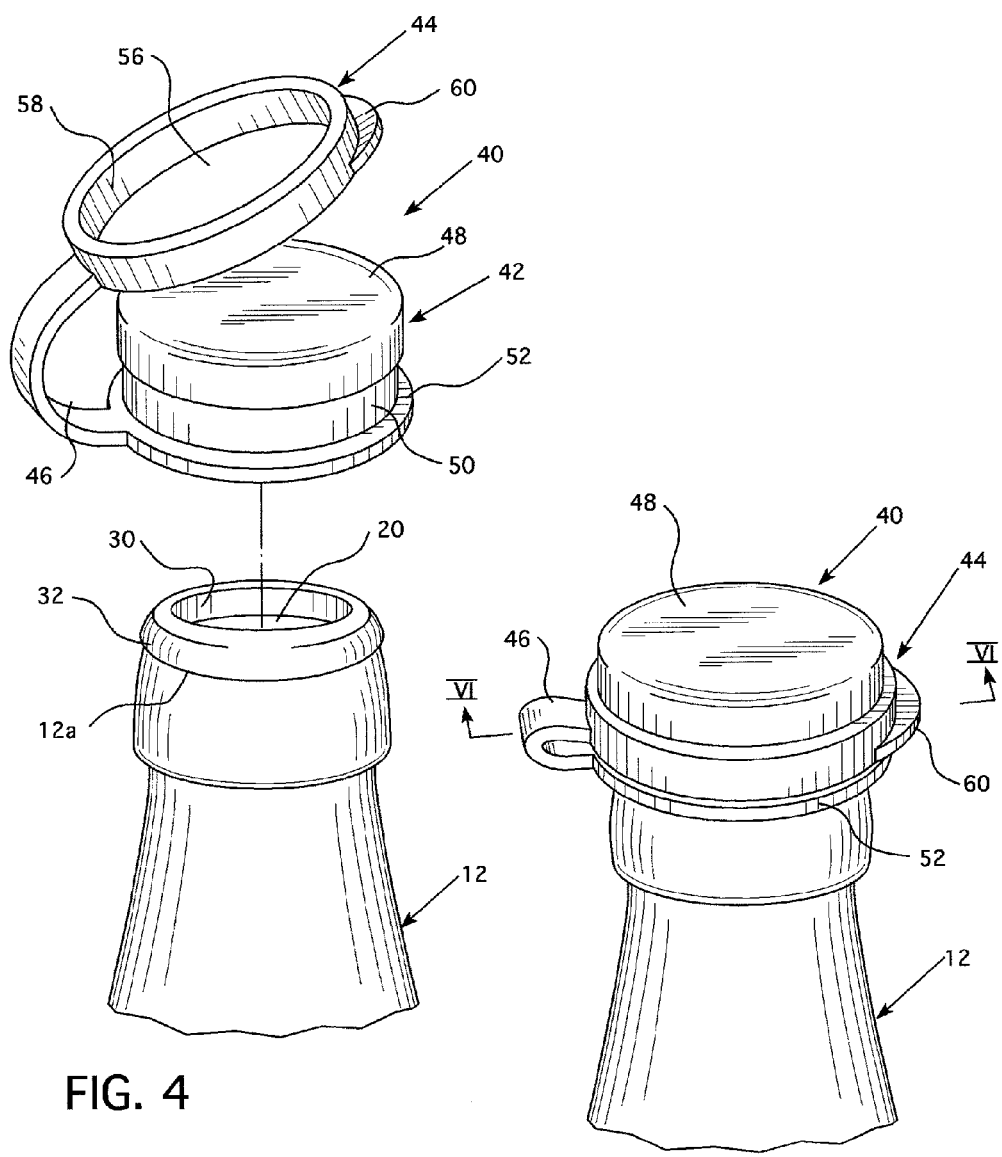
FIG. 4 is an exploded, perspective view of a reusable sealing bottle cap assembly of a second embodiment of the invention with a bottle partially shown.
FIG. 5 is a perspective view of the reusable sealing bottle cap assembly of FIG. 4 secured to the open mouth of a bottle.
Figure 6:
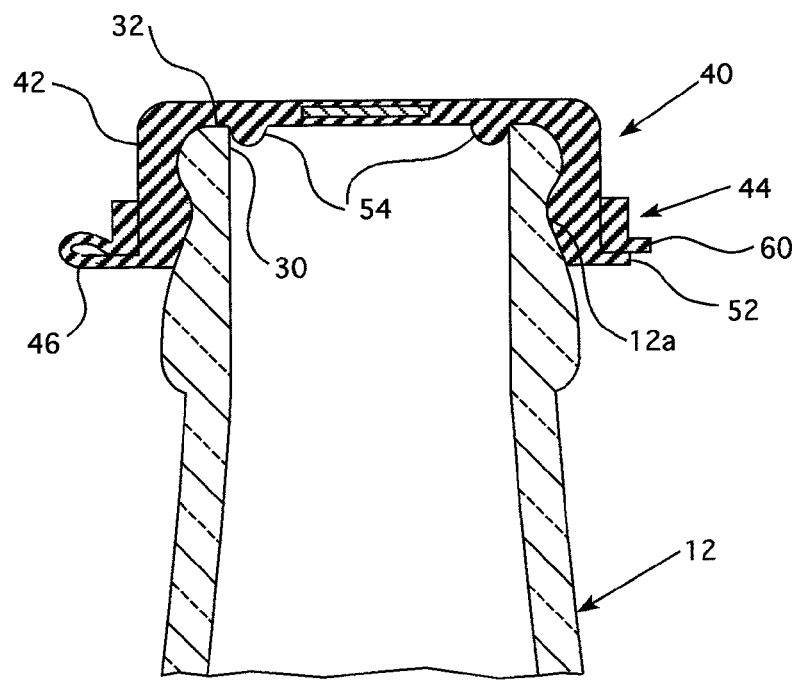
FIG. 6 is a cross-sectional view taken along lines VI-VI of FIG. 5.
Figure 7:
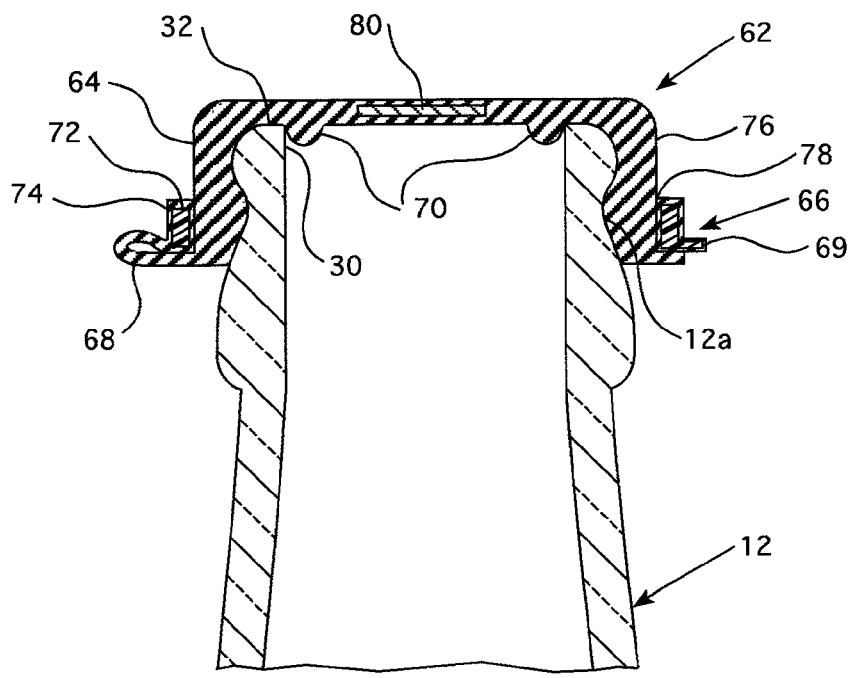
FIG. 7 is a cross-sectional view of the reusable sealing bottle cap assembly of a further embodiment of the annular ring of the cap of FIG. 5.

FIGS. 1, 2 and 3 illustrate a first embodiment of a reusable sealing bottle cap assembly of the invention. FIGS. 4, 5 and 6 illustrate a second embodiment of a reusable sealing bottle cap assembly of the invention. FIG. 7 illustrates the cap having a straight wall 78 for receiving the annular ring 66 of the cap assembly 62 and illustrates the annular ring 66 comprising an inner rigid material 72 and a flexible outer material 74 for forming annular ring 66.

Referring first to FIGS. 1, 2 and 3, a reusable sealing bottle cap assembly 10 is shown for securement to a bottle 12. The reusable sealing bottle cap assembly 10 comprises a cap 14 and an annular ring 16.

As best shown in FIG. 1, cap 14 is comprised of an enclosed upper cover portion 18 for enclosing the open mouth 20 of bottle 12; a circumferential area 22 located adjacent to the enclosed upper portion 18 of cap 14 which as shown in FIGS. 1, 2 and 3 is a recess or groove for receiving and securing annular ring 16 onto and around cap 14; an extended ledge 24 adjacent to the circumferential area 22 and opposite to the enclosed upper cover portion 18; and as best shown in FIG. 3, a circumferential lip 26 located on the underside of cap 14 for placement of cap 14 into the inner edge 30 of a bead 32 formed in the open mouth 20 of bottle 12. It can be appreciated that the circumferential area 22 and the extended ledge 24 form a depending skirt which fits tightly onto bead 32 of the open mouth 20 of bottle 12 when cap assembly 10 is secured onto bottle 12. In some embodiments of the invention, the circumferential area 22 may not be indented to form a recess or groove for securing the annular ring 16 onto and around cap 14 as shown in FIGS. 1, 2 and 3. That is, the sidewall of cap 14 may extend straight down similar to that shown at reference numeral 78 in FIG. 7.

As best shown in FIG. 1 and still referring to FIGS. 2 and 3, annular ring 16 of cap assembly 10 comprises an annular opening 33, an annular sidewall 34, and opposed tab elements 36, 38.

Bottle 12 is of conventional form and includes bead 32 over which cap assembly 10 is positioned for closure of bottle 12. In several instances, bottle 12 is of the form commercially available and used by a home beer brewer. Bottle 12 may be comprised of but is not limited to glass, plastic, ceramic, and other suitable materials.

In order to seal bottle 12, cap 14 is first snapped down onto and around the open mouth 20 of bottle 12 so that the circumferential lip 26 on the underside of cap 14 enters into open mouth 20 and abuts the inner edge 30 of bead 32 of bottle 12 with the enclosed upper portion 18 of cap 14 enclosing the open mouth 20 of bottle 12 and the depending skirt of cap 14 extending down alongside the open mouth 20 and neck 12a of bottle 12. The material of cap 14 is flexible enough that cap 14 easily engages and totally surrounds open mouth 20 and neck 12a of bottle 12, but still rigid enough to provide a tight fit seal of cap 14. In order to further seal cap 14 onto bottle 12 so that cap 14 cannot be easily removed from bottle 12, annular ring 16 is brought down onto cap 14 and slid down along the depending skirt of cap 14 until annular ring 16 enters into area 22 of cap 14 for a tight snap-fit connection between annular ring 16 and cap 14. Both circumferential area 22 and extended ledge section 24 of cap 14 provide securement of annular ring 16 around cap 14 and neck 12a of bottle 12. The material of annular ring 16 is rigid enough that it fits down securely around cap 14 and bottle 12 so that annular ring 16 can tightly seal cap 14.

It is to be appreciated that when cap 14 is brought down onto and around neck 12a of bottle 12 that circumferential area 22 of cap 14 is located adjacent to and around the lower portion of bead 32 forming neck 12a of bottle 12 so that when annular ring 16 is tightly secured in circumferential area 22, bottle 12 is sealed. Referring particularly to FIG. 3, the thickness of circumferential area 22 of cap 14 appears to be greater than the thickness of the enclosed upper portion 18 of cap 14. In general, and as shown in exaggerated form, the compressive forces of annular ring 16 against cap 14 in the circumferential area 22 cause the material of cap 14 in this area to move and spread around bead 32 and neck 12a of bottle 12 resulting in an effective sealing of the contents in bottle 12.

Tab elements 36 and 38 of annular ring 16 extend radially outwardly and provide a convenient means for the removal of annular ring 16 from cap 14 and bottle neck 12a by an upwardly directed force generally applied by the thumb, finger or hand of the user. Conversely, tab elements 36 and 38 provide a convenient means for placement of annular ring 16 onto cap 14 and bottle neck 12a of bottle 12 by a downwardly directed force applied by the thumb, finger, or hand of the user. In summary, the two opposed tab elements 36 and 38 provide for an easy snap on and/or snap off of the annular ring 16 relative to cap 14 via a downward/upward force applied by the thumb, finger or hands of the user.

Extended ledge 24 of cap 14 may also provide a convenient means for removal and placement of cap 14 from and/or onto neck 12a of bottle 12 via an upwardly or downwardly directed force generally applied by the thumb, finger or hands of the user.

Both cap 14 and annular ring 16 may be formed by compression molding, injection molding, casting or by other methods known to those skilled in the art. In an embodiment of the invention, cap 14 and annular ring 16 are formed by injection molding.

In some embodiments of the invention, the material of bottle cap assembly 10 includes but is not limited to plastic resins; metals; silicones; bio-degradable materials; oxygen absorbing materials; and/or combinations thereof. In some embodiments of the invention, the plastic resins may include such as, for example, polyethylene, polypropylene, polystyrene, polyvinyl chloride, elastomer, and/or combinations thereof.

In some embodiments of the invention, the cap 14 and/or annular ring 16 may be comprised of metal. In some embodiments, a metal band may be embedded in the annular ring 16 and/or cap 14. In some embodiments, the cap 16 and annular ring may be fused by heat or other means for tamper proof purposes. In some embodiments, an additional annular ring (not shown) may be provided below annular ring 16 and heat fused or other means with annular ring 16 for tamper proof purposes.

In some embodiments of the invention, the material of cap 14 and annular ring 16 may be natural or synthetic rubber material, e.g. natural rubber, synthetic rubber, polyurethanes, vinyl polymers such as, for example, polyvinyl chloride, and/or copolymers of vinyl chloride with vinyl acetate or other monomers, and other essentially linear thermoplastic polymeric materials known to have the necessary resilience and resistance to attach to bottle 12 according to the contents of bottle 12 for which cap assembly 10 is intended.

In some embodiments, the material of cap 14 and annular ring 16 may comprise HDPE (high density polyethylene or LDPE (low density polyethylene). In some embodiments, the material of cap 14 and annular ring 16 may comprise polyethylene terephthalate (PET). In some embodiments, the material of cap 14 and annular ring 16 may comprise polycarbonates or ABS.

In some embodiments of the invention, the cap 14 may be made of a silicon material while annular ring 16 may be made of the materials disclosed in the preceding paragraph. The silicon cap could be exchanged for other suitable materials such as synthetic rubbers made of polymeric material which acts as an elastomer. An example of such a material is Hunan or Nytrial which is a copolymer of butadiene and acrylonytral.

In some embodiments of the invention, cap 14 and annular ring 16 may be made of a biodegradable material. Examples of suitable biodegradable materials include but are not limited to aromatic polyesters, such as those naturally produced including polyhydroxyalkanoates (PHAs and PHBs), polyhydroxyvalerate (PHV) and polyhydroxyhexanoate (PHH); such as those from a renewable resource, for example, polylactic acid (PLA); and such as synthetic polyesters, for example polybutylene succinate (PBS) and polycaprolactone (PCL). Other suitable biodegradable materials include but are not limited to polyanhydrides, polyvinyl alcohol, most of the starch derivatives; and cellulose esters like cellulose acetate and nitrocellulose and their derivatives (celluloid).

It can be appreciated from FIGS. 1, 2 and 3 that cap assembly 10 comprises two discrete and separate components, that is, cap 14 and annular ring 16, are not integrally connected.

The embodiment of FIGS. 4, 5, and 6 illustrate a further embodiment for a reusable sealing bottle cap assembly 40 of the invention. Reusable sealing bottle cap assembly 40 comprises a cap 42 and an annular ring 44 which are integrally connected via a strap or band 46. "Integrally connected" is defined herein as being a one-piece construction whereby cap 42, annular ring 44, and strap 46 are formed simultaneously during the manufacturing process, such as, for example, injection molding. In some embodiments of the invention, cap 42, annular ring 44 and strap 47 may be first individually formed and then connected together via a suitable process.

As best shown in FIG. 4, cap 42 is comprised of an enclosed upper cover portion 48 for enclosing the open mouth 20 of bottle 12; a circumferential area 50 located adjacent to the enclosed upper cover portion 48 of cap 42; an extended ledge 52 located adjacent to the circumferential area 50 and opposite to enclosed upper cover portion 48; and as best shown in FIG. 6, a circumferential lip 54 located on the underside of cap 42 for placement of cap 42 into the inner edge 30 of a bead 32 formed in the open mouth 20 of bottle 12. It can be appreciated that circumferential area 50 and extended ledge 52 form a depending skirt which securing fits onto bead 32 of the open mouth 20 and around neck 12a of bottle 12 when cap assembly 40 is assembled onto bottle 12. As shown in FIG. 4, the circumferential area 50 comprises a recess or groove for receiving and securing ring 44 onto and around cap 42.

As best shown in FIG. 4 and still referring to FIGS. 5 and 6, annular ring 44 of cap assembly 40 comprises an annular opening 56, an annular sidewall 58, and a tab element 60.

The use of reusable sealing bottle cap assembly 40 is similar to that disclosed herein above with respect to the reusable sealing bottle cap assembly 10 of FIGS. 1-3. The teachings disclosed herein above with respect to cap assembly 10 also apply to cap assembly 40 except that cap assembly 40 may be formed via injection molding with a single type of material wherein strap or band 46 connects annular ring 44 to cap 42, thereby making reusable sealing bottle cap assembly 40a one-piece construction. The material of cap assembly 40 may comprise those teachings taught hereinabove for cap assembly 10 of FIGS. 1-3.

FIG. 7 illustrates a further embodiment for a reusable sealing bottle cap assembly 62 comprising a cap 64 and an annular ring 66 which are integrally connected via a strap or band 68 and tab element 69. Reusable sealing bottle cap assembly 62 is similar to reusable sealing bottle cap assembly 40 of FIGS. 4, 5, and 6 and as shown in FIG. 7 sealing bottle cap assembly 62 comprises a circumferential lip 70 on the underside of cap 64 for placement of cap 64 into the inner edge 30 of bead 32 formed in the open mouth of bottle 12. In FIG. 7, sealing bottle cap assembly 62 comprises an annular ring 66 which, in turn, comprises an inner rigid material 72 and a flexible outer material 74 which encompasses inner rigid material 72 for forming annular ring 66. As shown in FIG. 7, the inner rigid material 72 extends vertically in annular ring 66 and extends horizontally into tab element 69 in order to provide more rigidity to tab element 69 for easy handling of annular ring 66 around and off of cap 64. In FIG. 7, the circumferential area 76 extends straight down as shown at reference numeral 78 for receiving annular ring 66 instead of having a recess or groove as shown in the embodiments of FIGS. 1 through 5. In an embodiment of the invention, the inner rigid material 72 of annular ring 66 comprises polypropylene; and the cap 48, strap 46 connecting cap 48 to annular ring 66, and the flexible outer material 74 of annular ring 66 comprise a thermoplastic elastomer.

Even though FIGS. 1 through 7 illustrates a circumferential lip 26, 54 and 70, it is to be appreciated that in some embodiments this circumferential lip is not necessary to tightly secure cap assemblies 10, 40 and 62 to bottle 12.

The construction of cap assemblies 10, 40 and 62 including their structure and material from which they are made allow for the cap assemblies to be cleaned, sanitized, and reused which may be contrary to some of the bottle cap assemblies of the current art which require that the bottle cap assembly be discarded after opening of the bottle.

The reusable sealing bottle cap assemblies 10, 40 and 62 may further comprise, especially on their respective cap 14, 48, 64 personal indicia, such as, for example, logos, initials, or designs. This is desirable if the cap assemblies 10, 40 and 62 are used by a home beer brewer whereby the personal indicia identify the home beer brewer per se. Additionally, the cap assemblies 10, 40 and 62 may comprise various colorants, where again, a distinctive home beer brewer can be recognized and identified. In some embodiments of the invention, the cap and the annular ring are heat fused or other means for tamper proof purposes.

The material of the reusable sealing bottle cap assemblies of the invention includes but is not limited to plastic resins; metals; silicones; bio-degradable materials; oxygen absorbing materials; and/or combinations thereof. In some embodiments of the invention, the circumferential area may comprise an annular recess or groove for receiving the annular ring. In some embodiments of the invention, the annular ring may be comprised of a rigid material, for example, a polypropylene, and the cap and strap or band which connects the cap to the annular ring may be comprised of a flexible material, such as, for example, thermoplastic elastomer. In some embodiments of the invention, the annular ring may be comprised of an inner rigid material, for example, polypropylene, and an outer flexible material, such as, for example thermoplastic elastomer.

In some embodiments of the invention, the cap and/or ring may contain a technology device, such as a radio frequency identification tag (RFID) to store and exchange data with other technology devices, such as RFID scanners, smart phones, and other internet connected devices. FIG. 7 illustrates such an RFID device 80 embedded in cap 64.

In some embodiments of the invention, the material of cap assemblies includes an oxygen absorbing material or contains a disc of oxygen absorbing material affixed to the inner side of the cap.

While the present invention has been described in connection with the preferred embodiments of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. A reusable sealing bottle cap assembly for a bottle having an open mouth and a neck extending down from the open mouth, the reusable sealing bottle cap assembly consisting essentially of:
   a cap having an enclosed upper portion for enclosing the open mouth of the bottle and a depending skirt extending straight downwardly from the enclosed upper portion of the cap, the depending skirt formed by an extended ledge and a circumferential area and extending between the extended ledge and the enclosed upper portion of the cap, the circumferential area of the depending skirt forming an inner wall and an outer wall; and
   an annular ring being a separate component from the cap and arranged around the cap to contact the outer wall of the circumferential area of the depending skirt of the cap and to abut against a top surface of the extended ledge of the depending skirt of the cap for securing the cap around the neck of the bottle for sealing the open mouth of the bottle;
   the cap being a one-piece construction and the inner wall and the outer wall of the circumferential area of the depending skirt of the cap each being a continuous smooth surface extending from the enclosed upper portion of the cap to the extended ledge of the cap, and the inner wall and the outer wall of the circumferential area of the depending skirt of the cap each being circularly contiguous around the circumferential area of the depending skirt.

2. The reusable sealing bottle cap assembly of claim 1, wherein the outer wall of the circumferential area of the depending skirt of the cap comprises a circumferential recess; and wherein the annular ring is located in the circumferential recess for securing the cap onto the bottle and sealing the open mouth of the bottle.

3. The reusable sealing bottle cap assembly of claim 2, wherein the annular ring has a cross-sectional configuration corresponding to the circumferential recess, wherein the cross-sectional configuration of the annular ring has dimensions substantially corresponding to the dimensions of the circumferential recess, and wherein the annular ring is structured to substantially abut against all the surfaces of the circumferential recess to fit tightly into the circumferential recess and around the circumferential area of the cap for pressurizing the liquid in the bottle.

4. The reusable sealing bottle cap assembly of claim 1, further comprising a circumferential lip located on the underside of the cap for placement of the cap into an inner edge of the open mouth of the bottle.

5. The reusable sealing bottle cap assembly of claim 1, wherein the reusable sealing bottle cap assembly further comprises a strap connecting the cap to the annular ring.

6. The reusable sealing bottle cap assembly of claim 1, wherein the annular ring comprises a relatively flexible outer material and a relatively rigid inner material.

7. The reusable sealing bottle cap assembly of claim 6, wherein the flexible outer material comprises a thermoplastic elastomer and the rigid inner material comprises polypropylene.

8. The reusable sealing bottle cap assembly of claim 1, wherein the cap assembly further comprises a material selected from the group consisting of plastic resins; metals; silicones; bio-degradable materials; oxygen absorbing materials; and combinations thereof.

9. The reusable sealing bottle cap assembly of claim 1, wherein the cap assembly further comprises a plastic resin material selected from the group consisting of polyethylene, polypropylene, polystyrene, polyvinyl chloride, elastomer, and combinations thereof.

10. The reusable sealing bottle cap assembly of claim 1, wherein the annular ring comprises a relatively rigid material and a relatively flexible material.

11. The reusable sealing bottle cap assembly of claim 1, wherein the annular ring further comprises at least one tab element for assisting in securing and removing the annular ring relative to the cap.

12. The reusable sealing bottle cap assembly of claim 1, wherein the annular ring further comprises two opposed tab elements extending outwardly from the annular ring for easy snap on and snap off of the annular ring relative to the cap.

13. The reusable sealing bottle cap assembly of claim 1, wherein at least the annular ring comprises metal.

14. The reusable sealing bottle cap assembly of claim 1, further comprising a technology device embedded in the reusable sealing bottle cap assembly.

15. The reusable sealing bottle cap assembly of claim 14, wherein the technology device comprises an RFID tag embedded in the cap of the reusable sealing bottle cap assembly.

\* \* \* \* \*